Patented Dec. 14, 1943

2,336,928

UNITED STATES PATENT OFFICE 2,336,928

FRUIT PRESERVATION

Frank Earl Denny, Yonkers, N. Y., assignor to Boyce Thompson Institute For Plant Research, Inc., Yonkers, N. Y., a corporation of New York No Drawing. Application February 3, 1942, Serial No. 429,391

10 Claims. (Cl. 99—154)

This invention relates to the preservation of plant tissue and particularly to preserving the original color of the cut surfaces of fruits, vegetables and other plant tissue. The invention aims to substantially inactivate the constituent or browning system causing discoloration in freshly cut plant tissue, and is an improvement upon the process of my United States Patent No. 2,093,865.

The cut surfaces of many kinds of plant tissue turn brown in a relatively short time, if exposed to air or other oxidizing influence. This color change is apparently due to oxidation of some of the plant substances. Some of the oxidation products thus formed are colored and this causes an impairment in the use and value of the plant tissue. The brown which develops on a peeled apple after a short exposure in air is a familiar example of the oxidizing action causing a color change.

As described in my aforementioned patent, various thioamide compounds are available for retarding color change on cut surfaces of plant tissue including the following compounds:

Thiocarbamide ($NH_2CSNH_2$)
Phenyl thiocarbamide ($NH_2CSNHC_6H_5$)
Ortho-tolyl thiocarbamide
  ($CH_3C_6H_4NHCSNH_2$)
Thioacetamide ($CH_3 \cdot CS \cdot NH_2$)
Thiosemicarbazide ($NH_2 \cdot NHCSNH_2$)

The cut surfaces of the plant tissue may be conveniently treated by immersion in or spraying with an aqueous solution of the thioamide. In using thiocarbamide, for example, which is a very effective and readily available compound, solutions containing from one-tenth gram to thirty grams of thiocarbamide per liter of water may be used.

As a result of further extensive investigations and experiments, I have found that the process described in my aforementioned patent may be supplemented with far-reaching effects in preserving the original color of cut fruits and vegetables. I have found that under certain conditions the thiocarbamide (or equivalent thioamide) treatment brings about the complete inactivation of the browning system, so that tissue so treated will not discolor on standing in air, even when it is soaked in water to remove the thiocarbamide from the tissue, or to dilute the contained thiocarbamide down to concentrations which are quite ineffective in preventing the browning of freshly-cut tissue.

The practices described in my aforementioned patent, as for example immersion in or spraying with the thioamide solution, do not destroy or render permanently inactive the browning system or constituent which causes discoloration of the plant tissue. I have now discovered that under proper conditions of treatment substantially complete inactivation of the browning system can be achieved. Thus, I have found that if the thioamide solution can be induced to penetrate deeply into the mass of the plant tissue, in contradistinction to the superficial surface treatment of my aforementioned patent, complete or nearly complete inactivation of the browning system is obtained. Mere immersion of the plant tissue in the thioamide solution does not result in such penetration of the solution within the mass of the tissue as to inactivate the browning system. However, immersion, such as dipping, followed by subsequent treatment calculated to induce deep penetration of the solution within the mass of the plant tissue does substantially inactivate the browning system. Thus, substantially complete inactivation of the browning system is obtained if, after immersion in the thioamide solution, the cut fruit slices, or the like, are subjected to a relatively low temperature (e. g., near or slightly below freezing) for a few days (in some cases, a few weeks) with fairly uniform distribution of the solution adhering to the slices throughout the body of slices undergoing treatment. Substantially complete inactivation of the browning system is also obtained if, after immersion in the thioamide solution, the cut fruit slices, or the like, are promptly dried with heated air, the moisture content restored to about 20%, and the thus dried fruit slices stored for several weeks (in some cases several months) at a moderately low temperature, e. g., 15° C. I have further discovered that if the treatment after immersion is only sufficient to inactivate the external layers of the cut fruit slices, or the like, heat can be advantageously utilized to inactivate the portions of the browning system that have not been inactivated by the thioamide.

Based on the foregoing discoveries, my present invention contemplates a process for the substantially complete inactivation of the browning system causing discoloration of freshly cut surfaces of plant tissue, more particularly fruits such as peaches, apples, pears, nectarines, apricots, bananas, etc. In accordance with the invention, the freshly cut plant tissue is first treated with a thioamide, preferably by immersing or dipping in a solution thereof, and is subsequently subjected to a thermal treatment adapted in conjunction with the thioamide associated with the plant tissue to substantially inactivate the browning system. Various types of thermal treatment are adapted, in conjunction with the thioamide associated with the plant tissue, to effect substantially complete inactivation of the browning system. Thus, the thermal treatment may include the maintenance of a relatively low or freezing temperature, or the maintenance of a moderately high temperature, until substantially complete inactivation of the browning system is obtained. Penetration of the thioamide within the mass of the plant tissue is beneficial and in some instances necessary for complete inactivation of the browning system. Time is required in inducing relatively deep or complete penetration of the thioamide. Usually more time is required where the thermal treatment involves a moderately high temperature than where the treatment involves a freezing temperature. Where drying is completed at a relatively high temperature, sufficient in itself to inactivate the browning system, the thioamide need penetrate only sufficiently within the mass of the plant tissue to inhibit discoloration until the browning system has been inactivated by heat.

In one practical application of the invention, I dip sliced fruit, for example sliced peaches, in a thiocarbamide solution made by dissolving one gram of thiocarbamide in one liter of water, put the dipped slices into a suitable container, for example a fruit jar of the Mason type, close the jar, up-end the jar and let it stand for three to six hours, then return the jar to the upright position and put it in a freezing room (temperature approx. $-10°$ C.) for one to two days. Then I remove the fruit from the cold room and thaw it. Fruit so treated will not turn brown on standing in air, nor will it turn brown when it is soaked in an excess of water for a day, with occasional decanting of the water and application of additional quantities of fresh water to bring about the removal of the thiocarbamide in the tissue or to dilute it to extremely low concentrations. The browning system can no longer function in fruit treated in this way.

That the thiocarbamide takes an active part in the destruction of the browning capacity of the cut plant tissue is shown by the result obtained in the following experiment: The fruit (sliced peaches) was not only dipped in the thiocarbamide solution, but cane sugar to the amount of 20 per cent by weight was added subsequent to the dipping and prior to the freezing. A control lot of sliced peaches was dipped in plain water, and 20 percent by weight of cane sugar was added. After a period in the freezing room (sufficient to freeze the fruit) all samples were removed and thawed in air at room temperature. The lot which had been initially dipped in the thiocarbamide solution showed no tendency whatsoever to brown or discolor, even when exposed in thin layers to air. The control lot had browned only in the top one inch of the fruit in the jar, while the fruit in the center and bottom of the jar had held its color quite well, presumably because the viscous sugar solution prevented entrance of oxygen to the lower layers or because the available oxygen was used up in browning the top layer. However, when these non-brown pieces from the lower layers of the control lot were placed in a thin layer on a watch-glass and exposed to air, they browned within two hours, and on soaking in water turned dark brown. This shows that the conditions in the jar during the freezing period were not such as to cause loss of the browning system in the absence of thiocarbamide, and indicates that thiocarbamide by its presence brings about the loss of capacity of the plant tissue to brown.

Complete inactivation of the browning system of pears and apples may be obtained by dipping the fruit slices in a thiocarbamide solution and freezing at about $-10°$ C. For pear tissue a 0.1% thiocarbamide solution is satisfactory, and the duration in the frozen condition should be about two to four days. For apple tissue the dipping solution preferably contains about two grams of thiocarbamide per liter of water (0.2% solution), and the duration period in the frozen condition is about one to three weeks. It will thus be seen that different plant tissues (e. g., peaches, pears, apples, etc.) may require different concentrations of the thioamide in the dipping solution, and varying periods of time to induce adequate penetration of the thioamide within the mass of the tissue to obtain substantially complete inactivation of the browning system. Simple tests will show the optimum or necessary concentration of thioamide in the dipping solution and the optimum or necessary duration in the frozen condition for any particular plant tissue in order to substantially inactivate the browning system.

In the foregoing examples, fairly uniform distribution of the thioamide solution adhering to the fruit slices throughout the body of slices undergoing treatment is secured by two or more up-endings or reversals of the container. When the freshly dipped fruit slices are first placed in the container, the adhering thioamide solution tends to gravitate towards the bottom of the container, thus depriving the upper layer of adequate solution for satisfactory penetration. By up-ending the container, the solution gravitates in the reverse direction with respect to the body of slices therein, and in this manner the top layer never becomes dry or depleted of solution. In commercial practice, it is convenient to initially pack the freshly dipped fruit slices in a conventional freezing can for three hours or so, with up-ending of the can one or more times to insure fairly uniform distribution of the adhering thioamide solution throughout the body of fruit undergoing treatment, and to then place the can in the freezing room or alternatively to pour the fruit from the can that has contained the dipped fruit for three hours into a similar empty can just before the fruit is placed in the freezing room.

In another practical application of the invention, cut fruit slices, after immersion in an aqueous solution of a thioamide, are promptly dried in a current of moderately heated air, and stored at a moderately low temperature, preferably with a moisture content around 20%. Thus, for example, apple slices are dipped in a 0.1% solution of thiocarbamide and dried in a current of air at 35° C. for 1 to 2 days. The dried fruit is then stored in a container over the proper concentration of sulphuric acid to permit the dried fruit to take up about 20% moisture by weight, and stored at 15° C. After a storage period of about 6 months, the apple slices are white or slightly pinkish, and when soaked in an excess of water, the pinkish color disappears, leaving the apple tissue white with no subsequent discoloration whatsoever. Here again, the concentration of the thioamide solution may be increased to 0.2%, or higher, with advantage in treating apples and other fruit. There is some evidence that a higher concentration of the thioamide in the dipping solution permits some shortening of the storage period.

In still another practical application of the invention, apple slices (or rings) are dipped into a 0.2% aqueous solution of thiocarbamide, and then dried in a current of air at about 27° C. for 1 day. The partially dried fruit is then put in an oven drier at a temperature of 70–75° C. for about 2 hours. Partial drying in a current of air at about 35° C. for about 16 hours, followed by oven drying at a temperature of about 75° C. for about 2 hours is equally effective. In this treatment, the thioamide holds the color until the relatively high temperature of the heat treatment (70–75° C.) completes the inactivation of the browning system, and consequently the thioamide needs to penetrate only the external layer of the plant tissue. This method of treatment is of particular advantage where rapid inactivation of the browning system is desired. After completion of the oven drying, the moisture content of the dried fruit may be subsequently adjusted if desired, either prior to or after storage where the dried fruit is to be stored and not immediately used.

The invention is of particular application in the preservation of fruit for relatively long periods of time. Thus, many ripe fruits are dried and stored for subsequent out-of-season use, and other ripe fruit is frozen and stored for later use. When the thioamide solution adhering to the sliced fruit is more or less uniformly distributed throughout the body of fruit undergoing treatment, freezing at a temperature around —10° C. for a few days effects complete or nearly complete inactivation of the browning system. In the case of fruit dried at moderately high temperatures, a longer period of time is required to obtain sufficient penetration of the thioamide for complete inactivation of the browning system. Where the partially dried fruit is oven dried at a relatively high temperature, inactivation of the browning system is obtained in about 2 hours following a preliminary drying period of about 1 day. In any case, the thermal treatment contemplated by the invention, after immersion in the thioamide solution, is such as to effect substantially complete inactivation of the browning system. This thermal treatment must, of course, be such as not to destroy or deteriorate the tissue. The treatment should be initiated promptly after immersion, and before any deterioration or discoloration of the plant tissue can take place. In drying, too high temperature and too rapid drying should be avoided. And storage temperatures should be sufficiently low to prevent decay or other deterioration of the plant tissue.

I claim:

1. A process for the substantially complete inactivation of the browning system causing discoloration of freshly cut surfaces of plant tissue, which comprises treating the freshly cut plant tissue with an aqueous solution of thioamide, and subsequently subjecting the cut plant tissue to a freezing temperature in the course of which the thioamide associated with the cut plant tissue in conjunction with the freezing temperature effects substantially complete inactivation of the browning system.

2. A process for the substantially complete inactivation of the browning system causing discoloration of freshly cut surfaces of plant tissue, which comprises treating the freshly cut plant tissue with on aqueous solution of thiocarbamide, and subsequently subjecting the cut plant tissue to a freezing temperature in the course of which the thiocarbamide associated with the cut plant tissue in conjunction with the freezing temperature effects substantially complete inactivation of the browning system.

3. A process for the substantially complete inactivation of the browning system causing discoloration of freshly cut surfaces of plant tissue, which comprises immersing the freshly cut plant tissue in an aqueous solution containing about 0.1 to 0.2% of thiocarbamide and subsequently subjecting the cut plant to a freezing temperature in the course of which the thiocarbamide associated with the cut plant tissue in conjunction with the freezing temperature effects substantially complete inactivation of the browning system.

4. A process for the substantially complete inactivation of the browning system causing discoloration of freshly cut surfaces of plant tissue, which comprises immersing the freshly cut plant tissue in an aqueous solution of thiocarbamide, drying the cut plant tissue at a temperature in the neighborhood of 27° to 35° C. for several hours to reduce the moisture content to around 20 per cent and subsequently subjecting the dried cut plant tissue to a heat treatment at a temperature in the neighborhood of 70° to 75° C. for a few hours in the course of which the thiocarbamide associated with the cut plant tissue in conjunction with the heat treatment effects substantially complete inactivation of the browning sysem.

5. A process for the substantially complete inactivation of the browning system causing discoloration of freshly cut surfaces of plant tissue, which comprises immersing the freshly cut plant tissue in an aqueous solution of a thioamide, then subjecting the cut plant tissue with some adhering thioamide solution to a freezing temperature, and maintaining the cut plant tissue in the frozen condition until substantially complete inactivation of the browning system is obtained.

6. A process for the substantially complete inactivation of the browning system causing discoloration of freshly cut surfaces of plant tissue, which comprises immersing the freshly cut plant tissue in an aqueous solution of a thioamide, then subjecting the cut plant tissue with some adhering thioamide solution to drying induced by heat and a current of air, and storing the dried cut plant tissue at a temperature around 15° C. and with moisture content adjusted to around 20% until substantially complete inactivation of the browning system is obtained.

7. A process for the substantially complete inactivation of the browning system causing discoloration of freshly cut surfaces of plant tissue, which comprises immersing the freshly cut plant tissue in an aqueous solution of thiocarbamide, then subjecting the cut plant tissue with some adhering thiocarbamide solution to a freezing temperature around —10° C., and maintaining the cut plant tissue in the frozen condition for from one to several days.

8. A process for the substantially complete inactivation of the browning system causing discoloration of freshly cut surfaces of plant tissue, which comprises immersing the freshly cut plant tissue in an aqueous solution of thiocarbamide, then subjecting the cut plant tissue with some adhering thiocarbamide solution to drying in a current of moderately heated air, adjusting the moisture content of the dried cut plant tissue to around 20%, and then storing the dried cut plant tissue with its adjusted moisture content at a temperature around 15° C. for from one to several months.

9. A process for the substantially complete inactivation of the browning system causing discoloration of freshly cut surfaces of plant tissue, which comprises immersing the freshly cut plant tissue in an aqueous solution of thiocarbamide, packing the cut plant tissue with some adhering thiocarbamide solution in a closed container for several hours during which period the container is up-ended at least once, then subjecting the cut plant tissue to a freezing temperature, and maintaining the cut plant tissue in the frozen condition for from one to several days.

10. A process for the substantially complete inactivation of the browning system causing discoloration of freshly cut surfaces of plant tissue, which comprises immersing the freshly cut plant tissue in an aqueous solution of a thioamide, then subjecting the cut plant tissue with some adhering thioamide to partial drying in a current of moderately heated air, and completing the drying of the plant tissue at a relatively high temperature in a short time interval in the course of which the high temperature and duration of drying complete the inactivation of the browning system.

FRANK EARL DENNY.